United States Patent [19]

Babinec

[11] Patent Number: 5,377,039
[45] Date of Patent: Dec. 27, 1994

[54] POLYMERIC ELECTROCHROMIC ELECTRODES

[75] Inventor: Susan J. Babinec, Midland, Mich.

[73] Assignee: The Dow Chemical Company, Midland, Mich.

[21] Appl. No.: 15,965

[22] Filed: Feb. 5, 1993

[51] Int. Cl.$^5$ .............................. G02F 1/01
[52] U.S. Cl. .................. 359/265; 359/268; 359/269; 359/270; 359/273
[58] Field of Search ............ 359/265, 268, 270, 273, 359/275, 267, 266, 269

[56] References Cited

U.S. PATENT DOCUMENTS

| | | |
|---|---|---|
| 3,283,656 | 11/1966 | Jones et al. |
| 3,560,078 | 2/1971 | McIntyre et al. |
| 4,175,838 | 11/1979 | Randin |
| 4,231,641 | 11/1980 | Randin |
| 4,335,938 | 6/1982 | Giglia et al. |
| 4,338,000 | 7/1982 | Kamimori et al. |
| 4,375,318 | 3/1983 | Giglia et al. |
| 4,573,768 | 3/1986 | Polak et al. |
| 4,715,691 | 12/1987 | Sata et al. ............ 359/267 |
| 5,253,100 | 10/1993 | Yang et al. ............ 359/266 |
| 5,276,547 | 1/1994 | Couput et al. ............ 359/270 |
| 5,321,544 | 6/1994 | Parkhe et al. ............ 359/273 |

FOREIGN PATENT DOCUMENTS 0286826 11/1988 Japan ..................... 359/273

OTHER PUBLICATIONS

J. Chem. Soc. Faraday Trans. I, 1988, 84(11), 3941–3949, Takeo Shimidzu et al., Electrochromism of a Conducting Polypryrrole-Phosphotungstate Composite Electrode.

J. Electroanal. Chem., 279 (1990) 187–203, Keita et al., Surface Functionalization With Oxometallates Entrapped in Polymeric Matrices.

Primary Examiner—Eugene R. LaRoche
Assistant Examiner—Huan Hoang
Attorney, Agent, or Firm—Timothy S. Stevens

[57] ABSTRACT

An improved multilayer electrochromic device, the improvement being to the electrochromic layer which necessarily must include an anion exchanging polymer having a polyoxometallate electrochromic counter ion. An example is the use of $PW_{12}O_{40}^{3-}$ as the polyoxometallate electrochromic counter ion of an anion exchanging polymer of 90% quaternized 4-vinylpyridine and 10% styrene. Another example is the use of $H_2W_{12}O_{40}^{6-}$ as the polyoxometallate electrochromic counter ion of an anion exchanging polymer of 90% protonated 4-vinylpyridine and 10% styrene.

10 Claims, 1 Drawing Sheet

POLYMERIC ELECTROCHROMIC ELECTRODES

BACKGROUND OF THE INVENTION

Electrochromic devices are devices in which a physical or chemical change produced in response to an applied voltage results in a change in the reflective or transmissive properties of the device with respect to electromagnetic radiations, e.g., uv, visible, or IR radiations. Electrochromic materials are those materials which change coloration in an electrochromic device. Most electrochromic devices are multilayer devices containing an electrochromic electrode layer, an ion conductor layer, and a counter electrode layer. The counter electrode layer may or may not be electrochromic.

Many United States Patents have been granted for multilayer electrochromic devices see for example U.S. Pat. Nos. 4,175,838, 4,231,641, 4,335,938, 4,338,000, 4,375,318 and 4,573,768. U.S. Pat. No. 3,560,078 disclosed a multilayer electrochromic device not having an ion conductor layer, i.e., the electrochromic layer was in contact with the counter electrode layer. In any event, each electrode layer generally has a current carrier by which current and voltage are applied. For transmissive devices this current carrier is frequently a thin layer of a metal such as gold or platinum, or a thicker layer of an oxide such as tin doped indium oxide (ITO). A polymeric electrochromic electrode is an electrochromic electrode that incorporates an electrochromic material in a polymeric matrix.

Tungsten oxide ($WO_3$) is a highly preferred electrochromic material for electrochromic devices because of its excellent optical, chemical and physical properties. It is, perhaps, the most well studied and often used of all electrochromic materials. Tungsten oxide is often deposited as a layer in a multilayer electrochromic device by vacuum evaporation techniques, specifically DC and RF reactive sputtering from either the metallic tungsten or the oxide. Tungsten oxide can also be deposited as a layer in a multilayer electrochromic device by resistive or electron-beam thermal vacuum evaporation techniques. These vacuum deposition techniques require relatively expensive equipment. Therefore, it would be an advance in the art of electrochromic devices if a less expensive fabrication approach could be found.

As stated in Cotton and Wilkinson Advanced Inorganic Chemistry (1980) on page 852: "$Mo^{6+}$, $W^{6+}$, $V^{5+}$, $Nb^{5+}$, and $U^{6+}$ are known to form poly acids." "The poly acids of molybdenum and tungsten are of two types: (a) the isopoly acids [e.g., $H_2W_{12}O_{40}^{6-}$] and their related anions, which contain only molybdenum or tungsten [vanadium, niobium or uranium] along with oxygen and hydrogen, and (b) the heteropoly acids [e.g., $PW_{12}O_{40}^{3-}$] and their related anions, which contain one or two atoms of another element in addition to molybdenum or tungsten, [vanadium, niobium or uranium] oxygen and hydrogen." A subgrouping of heteropoly acids are the transition metal substituted heteropoly acids in which one transition metal atom, e.g., one tungsten atom, is replaced by a different transition metal atom (usually of the first transition series). Examples of this are $PCo_2W_{11}O_{40}H_2^{5-}$, $SiCoMo_{11}O_{40}H_2^{6-}$, $Co_2W_{12}O_{40}^{6-}$, and $SiFe_3W_{11}O_{39}^{5-}$. By definition herein, the term polyoxometallate includes all of the above isopoly acids and their salts, heteropoly acids and their salts, transition metal substituted isopoly acids and their salts and transition metal substituted heteropoly acids and their salts.

Most polytungstates and other polyoxometallates are known to be electrochromically active. For example: U.S. Pat. No. 3,283,656 issued to Gif Jones and Ralph Friedrich on Nov. 8, 1966 disclosed the use of polyvanadates, polytungstates, or polymolybdates in a one compartment liquid filled device, wherein the liquid contained the polyvanadate, polymolybdate, or polytungstate; and U.S. Pat. No. 3,560,078 issued to James Mcintyre and Robert Hansen on Feb. 2, 1971 disclosed the use of polytungstic and polymolybdic acids in a solid state multilayer device.

Schimidzu, et. al., 84 J. Chem. Soc., Faraday Trans. 1, 1988, page 3941, taught the use of a polyoxometallate in an electroactive and intrinsically electronically conducting polymer matrix such as a polypyrrole or polythiophene. However, in this system the polyoxometallate is released from the matrix upon application of some of the more cathodic coloring potentials. In addition, the electrode of Schmidzu, et. al. does not have a colorless state.

Keita, et. al., 279 J. Electroanal. Chem. 1990, 187, taught the use of polyoxometallates entrapped in an electronically conducting ion exchange polymer matrices coated onto carbon electrodes for purposes of catalysis of the hydrogen evolution reaction. However, Keita, et. al. is silent about the use of such electrodes applied to transparent electronic conductors for use in electrochromic devices and Keita, et al.'s electrode is immersed into a solution.

SUMMARY OF THE INVENTION

The present invention is a solution to the above mentioned problem of the fabrication of electrochromic electrodes using expensive vacuum deposition equipment. Electrochromic devices can be made using the present invention by relatively inexpensive coating techniques such as are generally used for dip coating or painting. The present invention is an improved multilayer electrochromic device comprising a polymeric electrochromic electrode incorporating an electrochromic material in a polymeric matrix, wherein the improvement comprises a nonintrinsically electronically conductive anion exchanging polymeric matrix comprising a polyoxometallate electrochromic counter ion. A highly preferred example is the use of $PW_{12}O_{40}^{3-}$ with an anion exchanging polymer matrix consisting essentially of about 90% quaternized 4-vinylpyridine and about 10% styrene. Another highly preferred example is the use of $H_2W_{12}O_{40}^{6-}$ with an anion exchanging polymer matrix consisting essentially of about 90% protonated 4-vinylpyridine and about 10% styrene.

DETAILED DESCRIPTION OF THE INVENTION

Figure 1:
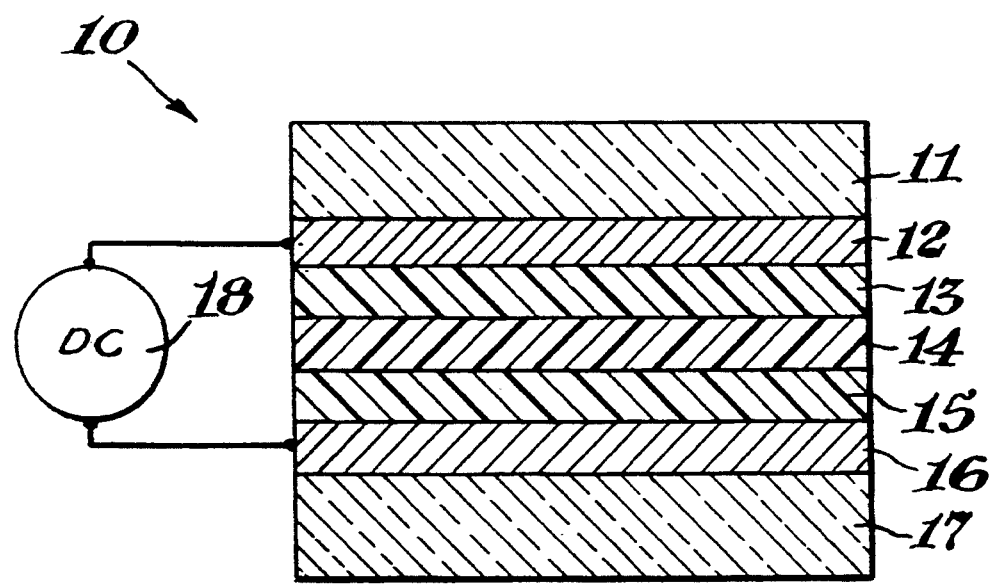
FIG. 1 is a cross-sectional view of a transmissive electrochromic device of the instant invention.

Referring now to FIG. 1, therein is shown a transmissive electrochromic device 10 of the instant invention. The device 10 is composed of several layers. Layer 11 is a transparent backing such as plastic or glass. Layer 12 is a transparent current carrier such as a thin layer of gold or indium tin oxide (ITO). Layer 13 is a nonintrinsically electronically conductive anion exchanging polymeric matrix comprising a polyoxometallate electrochromic counter ion. Layer 14 is an ion conductor such as a layer of perfluorinated sulfonated polymer such as NAFION brand perfluorinated sulfonated polymer or such as the perfluorinated sulfonated polymer described in U.S. Pat. No. 5,136,419. Layer 15 is a counter electrode layer such as a layer of iron II form ($Fe^{+2}$) perfluorinated sulfonated polymer such as iron II form ($Fe^{+2}$) NAFION brand perfluorinated sulfonated polymer or the iron II form of the perfluorinated sulfonated polymer described in U.S. Pat. No. 5,136,419. Layer 16 is a transparent current carrier such as a thin layer of gold or indium tin oxide (ITO). Layer 17 is a transparent backing such as plastic or glass.

Layers 11, 12, and 13 form a transmissive supported electrochromic electrode. Layers 15, 16 and 17 form a transmissive supported counter electrode. Layer 14 allows ion conduction between the electrochromic electrode and the counter electrode. When a direct current power supply 18 is connected to the layer 12 and the layer 16, then the device 10 becomes colored. When the power supply 18 is turned off, the layer 14 does not allow enough electrical conduction between the electrochromic electrode and the counter electrode to cause the device to rapidly lose its color. This is an important benefit in applications where it is desired to color the device 10 and then have it remain colored for an extended time, e.g., from several minutes to a day or longer, without the need to keep the power supply 18 turned on. When the polarity of the power supply 18 is reversed or the device is electrically shorted, then the device 10 loses its color.

The layers 15, 16 and 17 are also not critical in the instant invention and can be replaced with a single layer of a transparent conductor, e.g., a thin layer of gold. The instant invention in its broadest scope is a multi-layer electrochromic device having only one critical limitation. That limitation is that the electrochromic electrode comprise a nonintrinsically electronically conductive anion exchanging polymeric matrix comprising a polyoxometallate electrochromic counter ion. Preferably, the polyoxometallate electrochromic counter ion is not released from the anion exchange site(s) of the nonintrinsically electronically conductive anion exchanging polymeric matrix when the device is cycled from its relatively colored to its relatively colorless state. An intrinsically electronically conductive polymer is a polymer that is electronically conductive through its polymer backbone. A nonintrinsically electronically conductive polymer is not electronically conductive through its polymer backbone. Examples of nonintrinsically electronically conductive anion exchanging polymers include: poly 4-vinylpyridine; aminated polystyrene; and copolymers of 4-vinylpyridine and styrene.

Anion exchanging polymers are frequently polyamines of primary secondary or tertiary amine functionality that have been protonated with an acid. For example, poly 4-vinylpyridine is a secondary polyamine which can be protonated with hydrochloric acid to form poly 4-vinylpyridinium chloride. The chloride anion is the counter ion of the poly 4-vinylpyridinum. Poly 4-vinylpyridine can also be protonated with a polyoxometallate acid to form poly 4-vinylpyridinium having a polyoxometallate counter ion. Alternatively, poly 4-vinylpyridinium chloride can be exposed to a solution of a polyoxometallate ions so that a portion of the chloride counter ions are exchanged for polyoxometallate ions in a classical ion exchange process.

Anion exchanging polymers are also frequently polyquaternary amines such as quaternized 4-vinylpyridine. If quaternized 4-vinyl-pyridine is exposed to a solution of a polyoxometallate ions, then a portion of the counter ions of the quaternized 4-vinyl-pyridine are exchanged for polyoxometallate ions in a classical ion exchange process.

Synthesis of polyacids is believed to involve a polymerization of the orthoanion at characteristic pH values. The polymerization for tungsten is believed to be described by $nWO_4^{2-} + mH^+ = [H_{x-}W_nO_{4n-}[(\frac{1}{2})(m-x)]]^{2n-m)-} + \frac{1}{2}(m-x)H_2O$. Each polyoxometallate can be characterized by its "acid ratio" m/n, and its "condensation number" n. When other anions are present at the proper stoichiometry during the acidification, a heteropoly anion can result, e.g., $P_2W_{12}O_{40}{}^{3-}$ from a solution of tungstate and phosphate, and $SiW_{12}O_{40}{}^{4-}$ from a solution of tungstate and silicate.

The following references are believed to be helpful in synthesizing polyoxometallates: (a) Baker et al., J. Inorg. Nucl. Chem., 28, 447 (1966); (b) Weakley et al., J. Inorg. Nucl. Chem., 29, 2935 (1967); (c) Malik et al., J. Chem. Soc. (A), 2647 (1968); (d) Tourne et al., J. Inorg. Nucl. Chem., 32, 3875 (1970); (e) Dale et al., J. Chem. Soc. (A), 301 (1969); (f) Weakley et al., J. C. S. Dalton, 341, (1973); (g) Baker et al., J. A. C. S., 88, 10, 2329, (1966); and (h) Zonnevijlle et al., Inorg. Chem., 21, 2751, (1982).

The synthesis of a transition metal substituted poloxometallate can take two different approaches according to the literature. The first method, called destructive synthesis, is the partial degradation of the parent polyoxometallate in solution. This is accomplished by basifying a solution of the, e.g., $W_{12}$-polyoxometallate to generate the $W_{11}$ cluster and $WO_3$ in situ. The transition metal of interest can then be added to this solution to generate the desired product (Tourne, et al., Inorg. Nucl. Chem., 32, 1970, 3875 and Weakley, et al., J. Inorg. Nucl. Chem., 29, 1967, 2935).

The second and more preferable method reported for the synthesis of a transition metal substituted polyoxometallate is the constructive synthesis to synthesize, e.g., the $W_{11}$ fragment directly and then introduce the transition metal. The combination of eleven equivalents of, e.g., $WO_4{}^{-2}$ and the hetero-center source, followed by strong acid will allow assembly of the cluster (Tourne, et al., Bull. Soc. Chim. France, 1969, 4, 1124). Several transition metals have been shown to be capable of being incorporated into the center of these clusters (Pope, et al., Inorg. Chem., 7, 1966, 1249; Varga, et al., Inorg. Chem., 9, 1970, 662; Mair, J. Chem. Soc., 1512, (1962); Brown, et al., J. Chem. Soc., 1512 (1962); and Weiner et al., Z. Anorg. Allg. Chem., 572 (1989) 164). A range of conditions have been proposed for both the destructive and constructive routes (Zonneville et al., Inorg. Chem., 21, 1982, 2751; Toth et al., J. A. C. S., 1989, 361; Toth et al., Inorg. Chem. 29, 1990, 1952; Zonneville et al., Inorg. Chem., 22, 1983, 1198; and Baker et al., J. A. C. S., 94, 1972, 5499).

Many polyoxometallates are available commercially. For example, many are available from Fluka Chemical Corporation, Ronkonkoma, New York or Aldrich Chemical Company, Milwaukee, Wis.

EXAMPLE 1

This example will describe the manufacture of of an electrochromic device like that shown in FIG. 1, wherein the layer 13 comprises a copolymer of quaternized 4-vinyl pyridine and styrene having a polyoxometallate electrochromic counter ion of $(PW_{12}O_{40})^{3-}$. A first 1×2 inch indium/tin oxide (ITO) coated glass slide (PD5005HW or PD5005FW, Donnelly Corp., Holland, Mich.) is cleaned by soaking it in a 50% sodium hydroxide solution for 10–15 minutes followed by rinsing with deionized water. The ITO side of one end of the glass slide is then coated with silver paint to facilitate an electrical connection to the ITO layer.

Five grams of 90% 4-vinylpyridine, 10% styrene copolymer (Catalog No. 19,207-4, Aldrich Chemical Company, Milwaukee, Wis.) is dissolved in 100 milliliters of 2-propanol. Thirty eight milligrams of 1-10 dibromodecane (Aldrich Catalog No. D3,980-0) is dissolved in 100 milliliters of 2-propanol. These two solutions are then mixed together to form a quaternized 4-vinylpyridine, styrene copolymer solution.

The quaternized 4-vinylpyridine, styrene copolymer solution is used to coat the cleaned ITO side of the first glass slide using the following procedure. The slide is spun in the horizontal plane, ITO side up, at a rate of 450 revolutions per minute. An excess of the quaternized 4-vinylpyridine, styrene copolymer solution is deposited on the rotating slide. The slide is rotated for an additional 100 seconds. The slide is then heated at 80 degrees centigrade for 24 hours to form a dried quaternized 4-vinylpyridine, styrene copolymer layer on the slide. The quaternized 4-vinylpyridine, styrene copolymer that coats the silver painted portion of the slide is gently removed to expose the silver paint. The quaternized 4-vinylpyridine, styrene copolymer coating could have been formed, of course, by dip coating, spray coating or any other coating technique.

A solution of $(PW_{12}O_{40})^{3-}$ is prepared as follows. Two grams of phosphotungstic acid, $H_3PW_{12}O_{40}$ (Catalog No. 79690, Fluka Chemical Corporation, Ronkonkoma, N.Y.) is dissolved in 100 milliliters of methanol. The first glass slide is then immersed for 2 hours into the solution of $(PW_{12}O_{40})^{3-}$ to place a portion of the quaternized 4-vinylpyridine, styrene copolymer layer on the slide in the $(PW_{12}O_{40})^{3-}$ counter ion form. The slide is then washed with deionized water.

A first 1×1 inch sheet of NAFION brand perfluorinated sulfonated membrane, 0.007 inches thick, in the hydrogen counterion form (Aldrich Catalog No. 27,467-4) is rinsed in deionized water, then boiled in deionized water for ten minutes and then rinsed in deionized water again. The first sheet is then immersed for three hours into a solution that is 0.1 normal in $Fe(NH_4)_2(SO_4)_2$ and 1 molar in $H_2SO_4$ and then rinsed with deionized water to place a portion of the perfluorinated sulfonated membrane into the iron II counterion form.

A second 1×1 inch sheet of NAFION brand perfluorinated sulfonated membrane, 0.007 inches thick, in the hydrogen counterion form (Aldrich Catalog No. 27,467-4) is rinsed in deionized water, then boiled in deionized water for ten minutes and then rinsed in deionized water again.

A second 1×2 inch indium/tin oxide (ITO) coated glass slide (PD5005HW or PD5005FW, Donnelly Corp., Holland, Mich.) is cleaned by soaking it in a 50% sodium hydroxide solution for 10–15 minutes followed by rinsing with deionized water. The ITO side of one end of the glass slide is then coated with silver paint to facilitate an electrical connection to the ITO layer.

The second glass slide, still wet from its deionized water rinse, is placed horizontally, ITO layer up with its silver painted portion to the left. The first sheet of NAFION brand membrane, still wet from its deionized water rinse, is placed on the ITO layer at the right portion of the slide. The second sheet of NAFION brand membrane, still wet from its deionized water rinse, is placed on the first sheet of NAFION brand membrane. The first glass slide, still wet from its deionized water rinse, is placed, quaternized 4-vinyl pyridine, styrene copolymer layer down, on the first sheet of NAFION brand membrane with the silver painted portion overhanging to the right. The slides are then gently clamped together to remove the excess water from between the layers. A waterproof sealant such as SEAL-ALL brand sealant (Allen Products Corporation) is then used to seal the edges of the device to prevent the layers from drying out. Alternatively, a dispersion of NAFION brand perfluorinated ion-exchanger (Aldrich Catalog no. 27,470-4) can be used to wet the above layers prior to clamping.

A voltage of 1.5 to 2.5 volts is applied across the silver painted portions of the slides. The device colors with an optical density of about 0.8 absorbance units. The voltage is reversed and the device clears. The device is cycled from its colored to its relatively clear state about 4,000 times with no significant loss of performance.

EXAMPLE 2

This example will describe the manufacture of of an electrochromic device like that shown in FIG. 1, wherein the layer 13 comprises an anion exchanging polymer of protonated 4-vinyl pyridine, styrene copolymer having a polyoxometallate electrochromic counter ion of $(H_2W_{12}O_{40})^{6-}$. A first 1×2 inch indium/tin oxide (ITO) coated glass slide (PD5005HW or PD5005FW, Donnelly Corp., Holland, Mich.) is cleaned by soaking it in a 50% sodium hydroxide solution for 10–15 minutes followed by rinsing with deionized water. The ITO side of one end of the glass slide is then coated with silver paint to facilitate an electrical connection to the ITO layer.

Five grams of 90% 4-vinylpyridine, 10% styrene copolymer (Catalog No. 19,207-4, Aldrich Chemical Company, Milwaukee, Wis.) is dissolved in 100 milliliters of 2-propanol. The 4-vinylpyridine, styrene copolymer solution is used to coat the cleaned ITO side of the first glass slide using the following procedure. The slide is spun in the horizontal plane, ITO side up, at a rate of 450 revolutions per minute. An excess of the protonated 4-vinylpyridine, styrene copolymer solution is deposited on the rotating slide. The slide is rotated for an additional 100 seconds. The slide is then heated at 80 degrees centigrade for 24 hours to form a dried 4-vinylpyridine, styrene copolymer layer on the slide. The 4-vinylpyridine, styrene copolymer that coats the silver painted portion of the slide is gently removed to expose the silver paint. The 4-vinylpyridine, styrene copolymer coating could have been formed, of course, by dip coating, spray coating or any other coating technique.

A solution of $(H_2W_{12}O_{40})^{6-}$ is formed by the following procedure. Six grams of $Na_2WO_4$ are dissolved in 100 milliliters of deionized water to form a $Na_2WO_4$ solution. Six normal hydrochloric acid is slowly added to the $Na_2WO_4$ solution with rapid stirring. When the pH of the solution has reached 2, the addition of hydrochloric acid is stopped.

The first glass slide is then immersed for 2 hours into the solution of $(H_2W_{12}O_{40})^{6-}$ to place a portion of the 4-vinylpyridine, styrene copolymer layer on the slide in the $(H_2W_{12}O_{40})^{6-}$ counter ion form. The slide is then washed with deionized water.

A first 1×1 inch sheet of NAFION brand perfluorinated sulfonated membrane, 0.007 inches thick, in the hydrogen counterion form (Aldrich Catalog No. 27,467-4) is rinsed in deionized water, then boiled in deionized water for ten minutes and then rinsed in deionized water again. The first sheet is then immersed for three hours into a solution that is 0.1 normal in $Fe(NH_4)_2(SO_4)_2$ and 1 molar in $H_2SO_4$ and then rinsed with deionized water to place a portion of the perfluorinated sulfonated membrane into the iron II counterion form.

A second 1×1 inch sheet of NAFION brand perfluorinated sulfonated membrane, 0.007 inches thick, in the hydrogen counterion form (Aldrich Catalog No. 27,467-4) is rinsed in deionized water, then boiled in deionized water for ten minutes and then rinsed in deionized water again.

A second 1×2 inch indium/tin oxide (ITO) coated glass slide (PD5005HW or PD5005FW, Donnelly Corp., Holland, Mich.) is cleaned by soaking it in a 50% sodium hydroxide solution for 10-15 minutes followed by rinsing with deionized water. The ITO side of one end of the glass slide is then coated with silver paint to facilitate an electrical connection to the ITO layer.

The second glass slide, still wet from its deionized water rinse, is placed horizontally, ITO layer up with its silver painted portion to the left. The first sheet of NAFION brand membrane, still wet from its deionized water rinse, is placed on the ITO layer at the right portion of the slide. The second sheet of NAFION brand membrane, still wet from its deionized water rinse, is placed on the first sheet of NAFION brand membrane. The first glass slide, still wet from its deionized water rinse, is placed, protonated 4-vinyl pyridine, styrene copolymer layer down, on the first sheet of NAFION brand membrane with the silver painted portion overhanging to the right. The slides are then gently clamped together to remove the excess water from between the layers. A waterproof sealant such as SEAL-ALL brand sealant (Allen Products Corporation) is then used to seal the edges of the device to prevent the layers from drying out. Alternatively, a dispersion of NAFION brand perfluorinated ion-exchanger (Aldrich Catalog no. 27,470-4) can be used to wet the above layers prior to clamping.

A voltage of 1.5 to 2.5 volts is applied across the silver painted portions of the slides. The device colors with an optical density of about 0.8 absorbance units. The voltage is reversed and the device clears. The device is cycled from its colored to its relatively clear state about 4,000 times with no significant loss of performance.

EXAMPLE 3

This example will describe the manufacture of of an electrochromic device somewhat like that shown in FIG. 1, wherein the layer 13 comprises an anion exchanging polymer of protonated 4-vinyl pyridine, styrene copolymer having a polyoxometallate electrochromic counter ion of $(H_2W_{12}O_{40})^{6-}$ and wherein the layers 15, 16 and 17 are replaced with a single layer of gold. The device of this Example requires a vacuum deposition of the gold layer but the resulting device performs well in cycling tests.

A 1×2 inch indium/tin oxide (ITO) coated glass slide (PD5005HW or PD5005FW, Donnelly Corp., Holland, Mich.) is cleaned by soaking it in a 50% sodium hydroxide solution for 10-15 minutes followed by rinsing with deionized water. The ITO side of one end of the glass slide is then coated with silver paint to facilitate an electrical connection to the ITO layer.

Five grams of 90% 4-vinylpyridine, 10% styrene copolymer (Catalog No. 19,207-4, Aldrich Chemical Company, Milwaukee, Wis.) is dissolved in 100 milliliters of 2-propanol. The 4-vinylpyridine, styrene copolymer solution is used to coat the cleaned ITO side of the glass slide using the following procedure. The slide is spun in the horizontal plane, ITO side up, at a rate of 450 revolutions per minute. An excess of the 4-vinylpyridine, styrene copolymer solution is deposited on the rotating slide. The slide is rotated for an additional 100 seconds. The slide is then heated at 80 degrees centigrade for 24 hours to form a dried 4-vinylpyridine, styrene copolymer layer on the slide. The 4-vinylpyridine, styrene copolymer that coats the silver painted portion of the slide is gently removed to expose the silver paint. The 4-vinylpyridine, styrene copolymer coating could have been formed, of course, by dip coating, spray coating or any other coating technique.

A solution of $(H_2W_{12}O_{40})^{6-}$ is formed by the following procedure. Six grams of $Na_2WO_4$ are dissolved in 100 milliliters of deionized water to form a $Na_2WO_4$ solution. Six normal hydrochloric acid is slowly added to the $Na_2WO_4$ solution with rapid stirring. When the pH of the solution has reached 2, the addition of hydrochloric acid is stopped.

The glass slide is then immersed for 2 hours into the solution of $(H_2W_{12}O_{40})^{6-}$ to place a portion of the 4-vinylpyridine, styrene copolymer layer on the slide in the $(H_2W_{12}O_{40})^{6-}$ counter ion form. The slide is then washed with deionized water.

This slide is then coated with NAFION brand perfluorinated ion-exchanger by dipping it into a dispersion of NAFION brand ion-exchanger (Aldrich catalog no. 27,470-4) and then laying it horizontally so that the excess solvent of the dispersion of NAFION brand ion-exchanger can evaporate. Then the slide is placed in an oven at 90 degrees centigrade for 24 hours. The layer of NAFION brand ion-exchanger that coats the silver painted portion of the slide is gently removed to expose the silver paint. The dispersion of perfluorinated ion-exchanger described in U.S. Pat. No. 5,136,419 could have been used instead of the dispersion of NAFION brand ion-exchanger.

The exposed silver paint on the slide is masked and then the NAFION brand ion-exchanger layer of the slide is coated with a 200-300 Angstrom thick layer of gold by placing the slide in a deposition chamber operated at a base pressure of $1 \times 10^{-5}$ torr. A 600-1000 Angstrom thick additional layer of gold is made on a small peripheral portion of the gold layer to provide a thicker more rugged electrical connection to the gold layer.

A voltage of about 2.5 volts is applied between the silver painted portion of the slide and the gold layer. The device colors with an optical density of about 0.8 absorbance units. The voltage is reversed and the device clears. The device is cycled from its colored to its relatively clear state about 2,500 times with no significant loss of performance.

What is claimed is:

1. In an improved multilayer electrochromic device comprising a polymeric electrochromic electrode incorporating an electrochromic material in a polymeric matrix, wherein the improvement comprises a nonintrinsically electronically conductive anion exchanging polymeric matrix comprising a polyoxometallate electrochromic counter ion.

2. The improved device of claim 1 wherein the polyoxometallate comprises a polytungstate.

3. The improved device of claim 1 wherein the polyoxometallate comprises $(PW_{12}O_{40})^{3-}$.

4. The improved device of claim 2 wherein the polytungstate comprises $(H_2W_{12}O_{40})^{6-}$.

5. The improved device of claim 1 wherein the anion exchanging polymeric matrix comprises protonated polyvinylpyridine.

6. The improved device of claim 1 wherein the anion exchanging polymer matrix comprises quaternized polyvinylpyridine.

7. The improved device of claim 1 wherein the anion exchanging polymer matrix comprises a polyamine selected from the group consisting of a protonated primary polyamine, a protonated secondary polyamine, a protonated tertiary polyamine and a quaternary polyamine.

8. The improved device of claim 1 wherein the anion exchanging polymer matrix comprises a polyamine selected from the group consisting of a protonated primary polyamine, a protonated secondary polyamine, a protonated tertiary polyamine and a quaternary polyamine and wherein the polyoxometallate comprises a polytungstate.

9. The improved device of claim 1 wherein the anion exchanging polymer matrix is a copolymer consisting essentially of about 90% protonated 4-vinylpyridine and about 10% styrene and wherein the polyoxometallate comprises $(H_2W_{12}O_{40})^{6-}$.

10. The improved device of claim 1 wherein the anion exchanging polymer matrix is a copolymer consisting essentially of about 90% quaternized 4-vinylpyridine and about 10% styrene and wherein the polyoxometallate comprises $(PW_{12}O_{40})^{3-}$.

* * * * *